United States Patent
Heemskerk et al.

(10) Patent No.: US 9,734,155 B2
(45) Date of Patent: Aug. 15, 2017

(54) SYSTEMS AND METHODS FOR ENHANCING PERFORMANCE OF A CLUSTERED SOURCE CODE MANAGEMENT SYSTEM

(71) Applicant: ATLASSIAN PTY LTD, Sydney (AU)

(72) Inventors: Michael Heemskerk, Amsterdam (NL); Bryan Turner, Sydney (AU); Jason Hinch, Sydney (AU); Michael Studman, London (GB)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 15/181,058

(22) Filed: Jun. 13, 2016

(65) Prior Publication Data
US 2017/0075916 A1   Mar. 16, 2017

Related U.S. Application Data

(63) Continuation of application No. 14/853,723, filed on Sep. 14, 2015, now Pat. No. 9,367,554.

(51) Int. Cl.
*G06F 7/00* (2006.01)
*G06F 17/30* (2006.01)
(Continued)

(52) U.S. Cl.
CPC .......... *G06F 17/30106* (2013.01); *G06F 8/71* (2013.01); *G06F 12/0806* (2013.01);
(Continued)

(58) Field of Classification Search
CPC ......... G06F 17/30132; G06F 17/30106; G06F 12/0806
(Continued)

(56) References Cited

U.S. PATENT DOCUMENTS 6,810,259 B1 * 10/2004 Zhang ............... H04W 8/18
455/435.1
6,820,133 B1 * 11/2004 Grove ............... H04L 29/12066
709/238

(Continued)

OTHER PUBLICATIONS

U.S. Appl. No. 14/853,723, filed Sep. 14, 2015, Office Action, Dec. 16, 2015.

(Continued)

*Primary Examiner* — Usmaan Saeed
*Assistant Examiner* — Brian E. Weinrich
(74) *Attorney, Agent, or Firm* — Hickman Palermo Becker Bingham LLP

(57) ABSTRACT

A clustered source code management system is described. The system comprises a plurality of cluster nodes, a shared file server storing repository data, and a load balancer. Each of the plurality of cluster nodes is configured to receive an incoming request sent from a client computer, the incoming request being a source code management request to access repository data stored on the shared file server and process the incoming request to determine if a type of the incoming request is a cacheable request type. If the incoming request is of a cacheable request type, the cluster node is configured to determine if a valid cached response to the incoming request is available on storage media locally accessible to the cluster node; and, if so, respond to the incoming request by communicating the valid cached response to the client computer.

21 Claims, 9 Drawing Sheets

(51) Int. Cl.
*H04L 29/08* (2006.01)
*G06F 9/44* (2006.01)
*G06F 12/0806* (2016.01)
*G06F 15/16* (2006.01)

(52) U.S. Cl.
CPC .. *G06F 17/30091* (2013.01); *G06F 17/30097* (2013.01); *G06F 17/30132* (2013.01); *G06F 17/30203* (2013.01); *G06F 17/30598* (2013.01); *H04L 67/1097* (2013.01)

(58) Field of Classification Search
USPC ........................................................ 707/737
See application file for complete search history.

(56) References Cited

U.S. PATENT DOCUMENTS

| | | | | |
|---|---|---|---|---|
| 7,647,417 | B1* | 1/2010 | Taneja | G06F 17/30902 709/230 |
| 7,680,932 | B2* | 3/2010 | Defaix | G06F 8/71 709/203 |
| 8,204,871 | B1* | 6/2012 | Pawar | G06F 17/30132 707/639 |
| 2003/0236957 | A1* | 12/2003 | Miller | G06F 12/0813 711/163 |
| 2005/0144610 | A1* | 6/2005 | Zenz | G06F 9/5011 717/168 |
| 2006/0136485 | A1* | 6/2006 | Yared | G06F 17/3048 707/999.102 |
| 2006/0184819 | A1* | 8/2006 | Takagi | G06F 9/542 714/4.1 |
| 2013/0073808 | A1* | 3/2013 | Puthalath | H04L 67/2842 711/119 |
| 2015/0039674 | A1* | 2/2015 | Agarwal | H04L 67/2842 709/203 |
| 2017/0075917 | A1 | 3/2017 | Heemskerk | |

OTHER PUBLICATIONS

U.S. Appl. No. 14/853,723, filed Sep. 14, 2015, Notice of Allowance, Apr. 19, 2016.
Backbone-fetch-cache, Dated Dec. 15, 2014, 6 pages.
Heemskerk, U.S. Appl. No. 15/181,040, filed Jun. 13, 2016, Notice of Allowance, Dec. 16, 2016.
U.S. Appl. No. 15/181,040, filed Jun. 13, 2016, Office Action, Aug. 23, 2016.
Riesgo Setting Up a Central Git Repository on a Windows Server, dated May 27, 2013, pp. 1-30.

* cited by examiner

SYSTEMS AND METHODS FOR ENHANCING PERFORMANCE OF A CLUSTERED SOURCE CODE MANAGEMENT SYSTEM

BENEFIT CLAIM

This application claims the benefit as a continuation of application Ser. No. 14/853,723, filed Sep. 14, 2015, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to systems and methods for enhancing the performance of a clustered source code management system.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

In computer software development, source code management systems (also called revision control or version control systems) are used to track and manage computer program source code as the code is written and revised. For readability, the acronym "SCM" will be used in place of "source code management", and although SCM systems are predominantly used to track source code they can be used to track other data.

Examples of SCM systems include systems such as MERCURIAL, GIT, and BAZAAR. Generally speaking, SCM systems store data—typically source code—in repositories and facilitate access to that data from multiple different client systems. In order to work on a project, a user (using a client system) creates a local copy of the relevant data (e.g. program source code) from a repository and works on that local copy. If the user makes changes that are to be incorporated into the remote version of the data, the user's local copy of the data—or at least those portions that have been changed—is written back to the repository using the SCM system. The SCM system controls access to the repository data and also manages version control for the data.

A clustered SCM system is a SCM system that appears to users as a single SCM system, storing data in repositories and allowing data to be copied locally and changes to be written back, but is actually implemented on multiple physical compute nodes connected by a fast network. By dividing workload between compute nodes in the cluster in this way, a clustered SCM system can serve a larger capacity of users simultaneously than can an unclustered SCM system implemented on a single physical compute node before encountering resource constraints and degradation of performance.

Various approaches to making repository data available to clients in clustered SCM systems are used.

For example, in one approach, data repositories managed by a SCM system are shared over multiple file server nodes. SCM processes to read/write/manage data in a given repository are executed remotely via a Secure Shell (SSH) connection on the file server node that stores the relevant repository data. In this approach each server node must specialize as a "front end" or "file server" node for the data it stores. This impacts on the ability to balance workloads, as every SCM process must run on the same file server node that stores the relevant data. If workloads are such that certain data is in high demand, the file server(s) serving that data can come under much greater load than other file servers. Furthermore, sharing SCM repositories over multiple file server nodes can complicate backup/maintenance procedures compared, for example, to where a single file server is used. In addition, where repositories are shared over multiple file servers any operation/request that involves accessing more than one repository becomes difficult if not impossible.

An alternative approach to sharing repositories over multiple file servers is to replicate the entire contents of all SCM repositories managed by the SCM system on all nodes. This approach, however, introduces complexities (and data processing/communications overheads) in synchronizing repository data between nodes. When a client connected to a particular node makes changes to data those changes must be propagated through to all other nodes. This becomes even more complicated where different clients connected to different nodes make different/divergent changes to different copies of the same data, and those changes need to be reconciled. In addition, in order to replicate all SCM repositories on all nodes each node must have sufficient storage capacity to do so, increasing the storage requirements.

Yet another approach is to store data repositories managed by the SCM system on a single file server. Storing repositories on a single file server simplifies back up operations and removes the requirement to reconcile data across different copies of the repositories. In a single file server approach, however, any node needing to access a repository does so by connecting to the same single file server. This has performance implications.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Structural Overview

The present disclosure generally relates to a clustered SCM system. Embodiments may be implemented using a system such as STASH, which is commercially available from Atlassian Pty Ltd., Sydney, Australia, and provides a Git repository SCM system for enterprise users in which repositories are stored on computers that may be isolated from the public internet by firewalls and/or other appropriate security systems.

Git is a SCM system that was initially developed for LINUX kernel development. Each Git working directory is a repository that has complete history and revision tracking metadata and functions. STASH supports user authentication, repository security, and integration with existing databases and development systems, for use with large numbers of users, including thousands of users.

Figure 1:
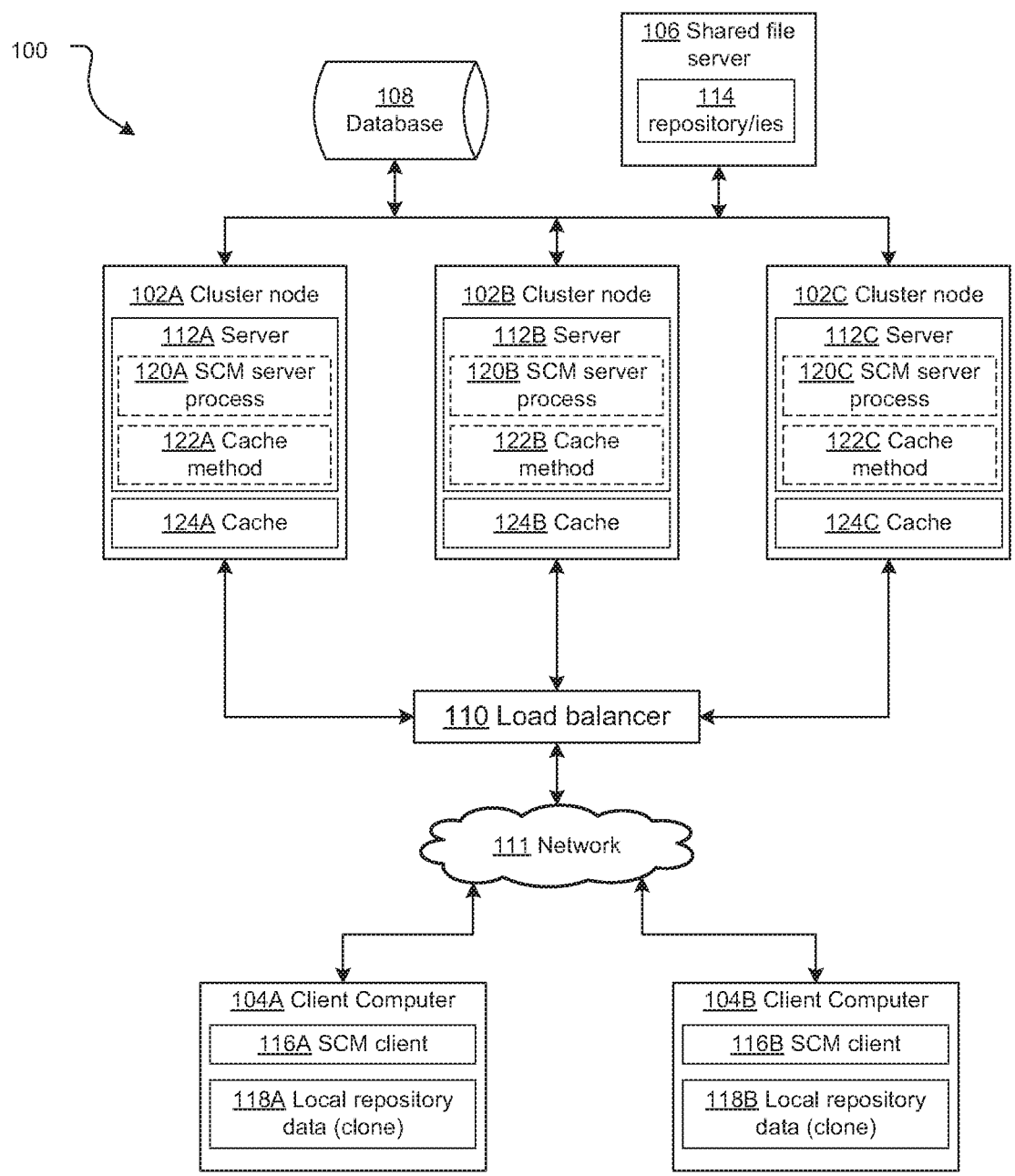
FIG. 1 illustrates a clustered SCM system.

FIG. 1 illustrates a clustered SCM system 100. SCM system 100 comprises one or more cluster nodes 102A, 102B, and 102C, which serve one or more client computers 104A and 104B. The cluster nodes 102A, 102B, and 102C are connected to a shared file server 106 and a database 108. Client computers 104A and 104B connect to the cluster nodes 102A, 102B, and 102C via a load balancer 110 over a communications network 111. The load balancer 110 distributes incoming connections from client computers 104A and 104B between the available cluster nodes 102A, 102B, and 102C.

Each cluster node 102A, 102B, and 102C is or runs on a computer, an example of which is described below (with reference to FIG. 2). Each cluster node 102A, 102B, and 102C runs a corresponding respective server 112A, 112B, and 112C, comprising one or more application programs, libraries, APIs or other software that implement server functionality. As described in detail below, two high level processes/methods which servers 112A, 112B, and 112C are configured to initiate in order to handle client requests are SCM server processes 120A, 120B, and 120C and cache methods 122A, 122B, and 122C, respectively. Although only a single server process 120A, 120B, and 120C and a single cache method 122A, 122B, and 122C are illustrated with respect to each server 112A, 112B, and 112C respectively, a given server 112 will start/manage many server processes and cache methods over the course of handling SCM requests. SCM server processes 120A, 120B, and 120C are also referred to as external SCM server processes to reflect the fact that the SCM server process is typically (but does not have to be) implemented as separate process on the operating system of the cluster node 102A, 102B, and 102C, with independent memory address space and threads of execution from the corresponding server 112A, 122B, and 122C.

While three cluster nodes (102A, 102B and 102C) running three servers (112A, 112B and 112C) have been illustrated, the SCM system 100 is scalable. Depending on the demand from client computers (and/or other performance requirements) cluster nodes 102 can be provisioned and de-provisioned on the fly to increase/decrease the number of servers 112.

The shared file server 106 and database 108 also run on a (or multiple) computer(s). The shared file server 106 maintains one or more data repositories 114, the contents of which are managed by the servers 112 (or, more specifically, by SCM server processes 120 started by the servers 112). Data stored by the shared file server 106 is accessed using industry standard protocols, for example the Network File System (NFS) protocol.

In the illustrated embodiment the cluster nodes 102, shared file server 106, and shared database 108 are interconnected by/coupled to a local area network (LAN) and/or wide area network (WAN) and may be logically located behind a firewall and/or other security measures.

Each client computer 104A and 104B runs a SCM client 116A and 116B respectively, as an application (or suite of applications) which configures the client computer 104A and 104B to perform client-side SCM system operations. Only two client computers (104A and 104B) running two clients (116A and 116B) have been illustrated, but normal operation of the system 100 will typically involve many more clients 116 connecting to servers 112 in order to access data from/write data to the repository 114.

In order to perform SCM operations, a SCM client 116 connects to a server 112 (via, in this example, load balancer 110). Communications between client computers 104 and the load balancer 110 are via a communications network 111 which may comprise, for example, an enterprise's LAN, a public network (such as the Internet), or a combination of public and private networks.

Hardware Overview

The operations/techniques described herein are implemented by one or more special-purpose computing systems or devices. For example, in system 100: each cluster node 102 is provided by a computer system; each client computer 104 is a computer system; shared file server 106 is provided by a computer system; database 108 is provided by a computer system; load balancer 110 is provided by a computer system; and network communications are provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
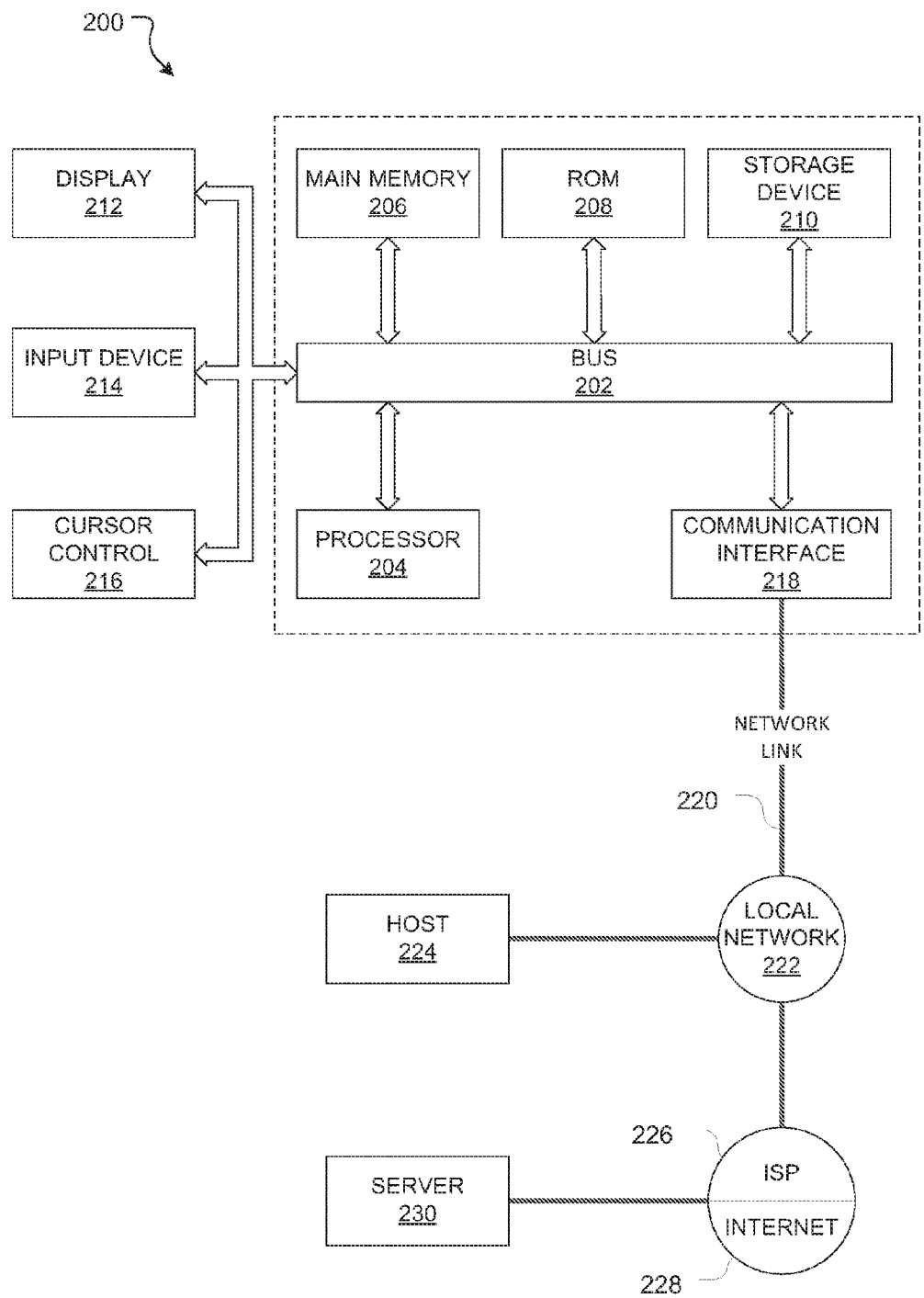
FIG. 2 illustrates a computer system with which various embodiments may be implemented.

By way of example, FIG. 2 provides a block diagram that illustrates one example of a computer system 200 upon which embodiments of the invention may be implemented. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212 (such as a cathode ray tube, LCD, LED, touch screen display or other display), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques and operations described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carries the digital data to and from computer system 2000, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and/or stored in storage device 210, or other non-volatile storage for later execution.

A computer system as described herein may be configured in a plurality of useful arrangements. In one approach, a computer system comprises a server computer (such as a cluster node 102) comprising one or more non-transitory computer-readable data storage media stored with one or more sequences of instructions which when executed cause the server computer to perform the operations/techniques that are described herein.

Server and SCM Server Processes

This section provides a high level overview of the typical operation of a server 112 that handles SCM client 116 requests by initiating SCM server processes 120 only. This is in contrast to the server operation described in the following sections which involve caching functionality.

SCM operations are commenced by a SCM client 116 initiating a connection with the server 112. Communications between the SCM client 116 and server 112 may be by any appropriate transport protocol. For example, the Git SCM system supports secure shell (SSH), Hypertext Transfer Protocol (HTTP), Hypertext Transfer Protocol Secure (HTTPS), and Git transport protocols. An incoming connection from a SCM client 116 is originally received by the load balancer 110. The load balancer 110 applies load balancing logic to determine which cluster node 102 (and, accordingly, which server 112) the connection should be directed to and routes the connection accordingly.

On receiving an incoming connection from a SCM client 116, server 112 (noting again that in this section server 112 is not configured to provide any caching functionality) starts a SCM server process 120 which performs the required processing to handle the client SCM request(s). This includes accessing data on the shared file server 106 to read and/or write data to the repository 114.

In the course of handling a single incoming connection from a SCM client 116, a SCM server process 120 may receive one or more SCM request(s) and send one or more SCM response(s) on that connection. The specific types of SCM request and SCM response, and the data they comprise, vary from one SCM system to another (e.g. Git or an alternative SCM system).

To illustrate handling of a typical SCM operation, processing and communications involved in responding to a request from a SCM client 116 to fetch repository data will be described.

For the purposes of providing examples in this specification, the context of a Git SCM system implemented using the secure shell (SSH) transport protocol is used. The techniques/features/methods described herein can be applied to other contexts. Actual protocol flows between a SCM client 116, load balancer 110, SCM server process 120 and shared file server 106, and accordingly the specific implementation details, will depend on a number of factors such as: the underlying SCM system (e.g. Git or an alternative SCM system); the SCM operation (e.g., clone, fetch, push, other); the transport protocol (e.g. SSH, HTTP, Git, other).

Figure 3:
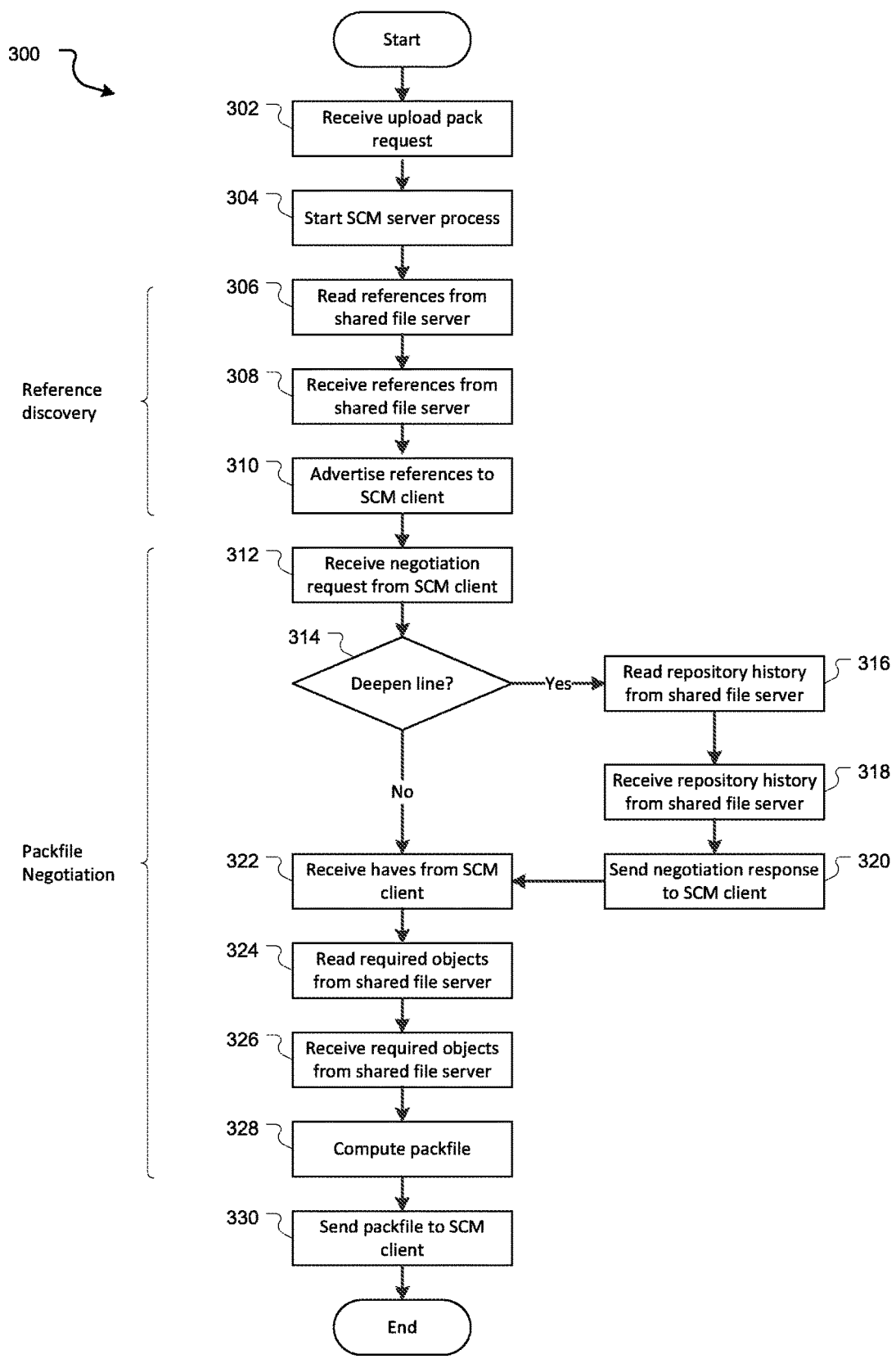
FIG. 3 illustrates a process for handling an example SCM request without caching.

FIG. 3 provides a flowchart 300 depicting high-level steps involved when a client computer 104A initiates a "git-upload-pack" command. This description is intended to be illustrative only and not all protocol communications/processing in handling a git-upload-pack command will be described.

A git-upload-pack command is initiated by a SCM client 116A and 116B when the SCM client 116A and 116B wishes to discover and/or fetch data from a repository 114 (stored on the shared file server 106 and accessed via a server 112A, 112B, and 112C). Fetched data is copied to locally accessible storage of the SCM client 116A and 116B (e.g. shown in FIG. 1 as repository clones 118A and 118B). This occurs when a user (human or programmatic) of a SCM client initiates a clone or fetch operation.

At 302 the server 112 receives an incoming SSH connection from a SCM client 116. The incoming connection is routed to the server 112 by the load balancer 110. In the Git SSH implementation a connection can be established and initial SCM request communicated with a command in the following format: ssh user@host "git-upload-pack 'project/repository.git'". In addition to establishing the connection with the server 112 (using the "user@host" credentials) this communication includes the command "git-upload-pack" and specifies the repository of interest (/project/repository.git).

At 304, once the connection with the SCM client 116 is established, the server 112 starts a SCM server process 120 to handle the client request. The SCM command (in this example "git-upload-pack '/project/repository.git'") is passed to the SCM server process 120. On receiving a git-upload-pack command the SCM server process 120 automatically initiates a reference discovery process.

At 306 the SCM server process 120 reads a list of repository references (and associated objects) from the shared file server 106. At 308 the list of repository references is received from the shared file server and at 310 the SCM server process advertises the references/objects that it has to the SCM client 116.

As part of advertising the available references/objects, the SCM server process 120 also communicates a capability list indicating capabilities supported by the server 112.

Although not illustrated, on receiving the advertised references the SCM client 116 may terminate the connection (for example if it decides that it does not need any data available in the repository).

If the connection is not terminated, a packfile negotiation phase is entered in which the references/objects required by the client 116, and the smallest amount of data that can be sent to meet the SCM client's requirements, are determined.

The negotiation phase commences with the SCM client 116 sending a negotiation request consisting of a want list specifying one or more objects the SCM client 116 wants; one or more shallow line(s) (specifying objects for which the SCM client 116 does not have all parents of); and an optional deepen line (being a request to truncate the history of older objects at a particular level specified by the deepen line). The negotiation request also includes a capability list specifying capabilities that the SCM client 116 wishes to be enabled for the connection (specifically, the capability list is communicated as part of the wants list).

At 312 the SCM server process 120 receives the negotiation request from the SCM client 116.

As noted, the negotiation request from the SCM client 116 may optionally include a deepen line. At 314 the SCM server process 120 checks to see if the negotiation request sent by the SCM client 116 includes a deepen line. If no deepen line was sent by the SCM client 116 the client 116 will immediately send a haves list which is received by the SCM server process 120 at 322.

If a deepen line was sent further packfile negotiation steps are performed (at 316, 318 and 320) and a response is sent to the SCM client 116 before the SCM client 116 sends the haves list.

At 316, which occurs if the SCM client 116 has sent a deepen line, the SCM server process 120 computes the set of objects which will comply with the request—i.e. the set of objects up to/including the depth specified in the deepen line. This involves the SCM server process 120: reading repository history data from the shared file server 106 (at 316); receiving data from the shared file server 106 (at 318); and sending a negotiation response consisting of shallow and/or unshallow line(s) to the SCM client 116 (at 320).

The negotiation response sent by the SCM server 120 indicates objects for which parent(s) will not be sent due to the depth level specified in the SCM client's deepen line, and objects for which all parents will be sent as they fall within the depth level.

The process then proceeds to 320.

After sending the negotiation request (in the event that the SCM client 116 does not send a deepen line), or after receiving the negotiation response from the SCM server process 120 (in the event that the SCM client 116 does send a deepen line), the SCM client 116 sends a list of have lines to the SCM server process 120. The haves include a list of objects that the SCM client 116 already has locally stored. The haves list may be empty—e.g. where the SCM client 116 does not have local access to any objects.

At 322 the SCM server process 120 receives the haves list from the SCM client 116. Although shown as a single block, communication of the haves list may involve multiple steps in which the SCM client 116 sends one or more blocks of haves and the SCM server process 120 acknowledges receipt.

The SCM server process 120 processes the haves list to determine what objects are needed by the SCM client 116. At 324 the SCM server process 120 reads the required objects from the shared file server 106 and at 326 the SCM server process 120 receives the requested objects from the shared file server 106. At 328 the SCM server process 120 computes a packfile (a stream of bytes comprising the data required by the SCM client 116), and at 330 the SCM server process 120 sends the packfile to the SCM client 116.

Although not shown, the SCM client 116 may, on receiving the packfile, report a status back to the SCM server process 120.

Figure 4:
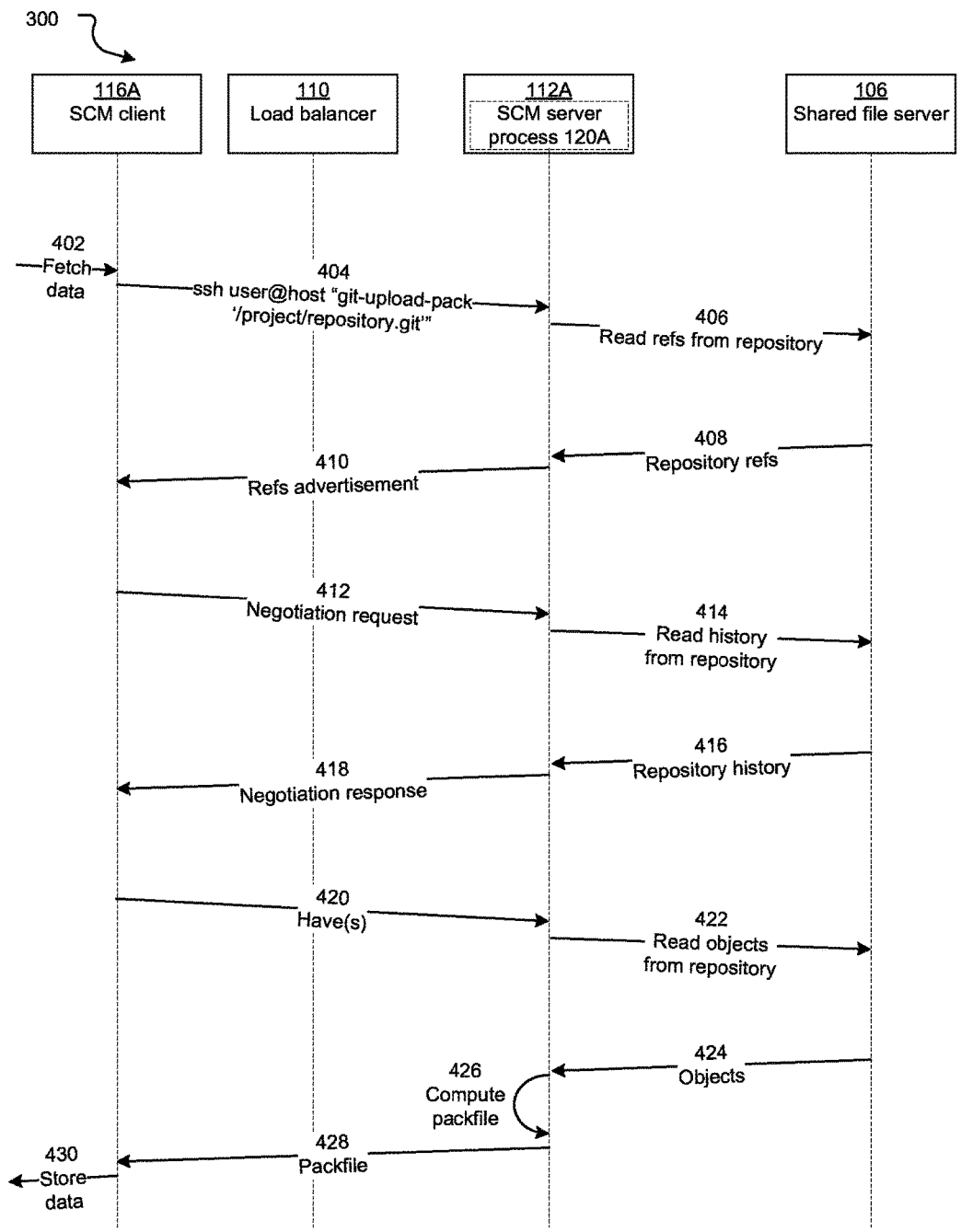
FIG. 4 is a message passing diagram illustrating communications made in the example process of FIG. 3.

FIG. 4 provides a message passing diagram representing the communications described in relation to flowchart 300.

The process commences at 402 with an operation being entered at the SCM client 116 to fetch data—e.g. a clone operation or a fetch operation.

At 404, the SCM client 116 initiates the connection with the server 112 and invokes the git-upload-pack command. As can be seen the SSH connection is initially received by the load balancer 110 which determines a server 112 (in this case server 112A) and routes the connection to that server. All other communications between the SCM client 116 and the server 112 are via the load balancer 110.

The server 112 starts a SCM server process 120 to handle the connection, and at 406 the SCM server process 120 reads repository references from the shared file server 106. At 408, the shared file server 106 returns the repository references. At 410, the SCM server process 120 advertises the repository references (and the SCM server capabilities) to the SCM client 116.

At 412, the SCM client 116 sends a negotiation request which includes capabilities the SCM client 116 wants enabled as well as any wants, shallows and (if applicable) a deepen line.

If the negotiation request includes a deepen line, this is detected by the SCM server process 120 and, at 414, it reads repository history data from the shared file server 106. At 416, the shared file server 106 returns the repository history. At 418, the SCM server process 120 sends the negotiation response to the SCM client 116.

If the negotiation request does not include a deepen line, communications 414, 416, and 418 are not performed. In this case after sending the negotiation request at 412 the SCM client 116 immediately sends haves at 420.

At 420, the SCM client 116 sends a haves list (which may be empty). At 422, the SCM server process 120 reads the objects required by the SCM client from the shared file server 106. At 424, the shared file server 106 returns the required objects. At 426, the SCM server process 120 computes the packfile and at 428 sends the packfile to the SCM client 116. At 430, the SCM client 116 unpacks the packfile and stores the data on locally accessible storage (i.e. clone 118 in FIG. 1).

Caching Operations

Handling a SCM request can consume significant CPU, memory, and communication bandwidth resources. The clustered implementation illustrated is such that if the overall workload of SCM requests exceeds the CPU and/or memory resources of the available nodes 102 additional nodes 102 can be provisioned on the fly. This is not the case, however, for the shared file server 106, which has a finite capacity to handle I/O operations and network traffic.

The techniques disclosed herein operate to improve the performance of a SCM system 100. This improvement in performance is achieved by introducing caching operations which, for certain SCM requests/operations, reduce the processing and memory load on server nodes 102, reduce communications between server nodes 102 and the shared file server 106, and (accordingly) reduce the I/O operations that need to be performed by the shared file server 106.

Generally speaking, performance of the SCM system 100 is improved by configuring servers 112 to implement cache methods 122 to handle incoming SCM requests. Under the operation of a cache method 122, responses to certain SCM requests are captured and stored/cached on fast local storage (e.g. a SCM cache 124) of the cluster node 102 on which the cache method 122 is running. Where possible, a cached response is used to respond to repeat SCM requests received from SCM clients 116.

If all of the SCM requests in a given SCM operation (e.g. a clone or fetch operation) can be responded to by a cache method 122 using cached responses, a SCM server process 120 does not need to be initiated. This serves to avoid the potentially significant processing by the SCM server process 120 and communications between the SCM server process 120 and shared file server 106 that would otherwise have been performed.

The inventors have identified that in practice, workloads containing many similar SCM requests are relatively common. As one example, the inventors have identified that it is common for Continuous Integration systems to clone the same repository 114 multiple times in order to perform multiple builds and test stages in parallel. Under such workloads, implementing the cache method described herein (or features/aspects thereof) is highly effective and can significantly increase the performance and capacity of cluster nodes 102 and/or the shared file server 106.

Cache Data and Maintenance

This section describes data used in cache operations and certain cache maintenance operations. Following this section, processing performed by the server 112 to implement cache methods 122 in one particular implementation will be described.

SCM Cache Entry

As noted, caching operations result in certain SCM responses being intercepted and cached. Cached SCM responses are stored by cache methods 122 in a SCM cache entry data structure on the local cache 124 (i.e. the cache 124 of the cluster node 102 on which the cache method 122 is running).

SCM cache entry data structures are individual to each cluster node 102. All cache methods that are run on a given cluster node (e.g. cache methods 122A running on cluster node 102A) have access to the SCM cache entry data structure (e.g. 124A) of that cluster node. Furthermore, the cache methods 122 started on a given cluster node (e.g. cache methods 122A running on cluster node 102A) do not need to access/be updated on the SCM cache entry data structures stored at any other cluster node (e.g. caches 124B or 124C maintained by cluster nodes 102B or 102C).

Table A below provides one example of a SCM cache entry data structure:

TABLE A

SCM cache entry data structure

| Key | Repository identifier | Response | Expiry timestamp | State | Statistics |
|---|---|---|---|---|---|
| clone\|3c 4ef7cff8 4ca3fd6 e0f86d3 bf97dc4 e | 2416 | \<binary stream\> | 1441652937 000 | available completed | created date: 1441638537000 last accessed date: 1441638717000 size: 142836 hits: 7 |

In this particular example, each SCM cache entry comprises a key, a repository identifier, the response, an expiry timestamp, a state, and statistics.

The key is generated based on relevant data included in the SCM request which resulted in the SCM response being generated and cached. Sufficient request data is used to enable a unique key to be generated for the particular SCM request—i.e. so that all SCM requests that are materially the same will result in the same key being generated.

Various techniques may be used to generate the key. In certain embodiments the cache method 122 extracts relevant information from the SCM request as one or more character strings. The extracted information is then processed using a cryptographic hash function to generate a unique key for the particular character string(s) extracted. Any appropriate cryptographic hash function may be used, for example the MD5 message-digest algorithm.

By way of specific example, in the Git context the key generated by the cache method 122 for a "refs" request is the character string "refs|", and does not depend on any other information in the request. But for a Git "clone" request (i.e. where the SCM client 116 communicates wants but no haves or shallows) the key consists of the character string "clone|" followed by a cryptographic hash of the following information sent by the SCM client 116 in the SCM request: the capabilities, the depth level specified by the deepen line (if any), the wants, and a boolean flag indicating whether or not the terminating "flush" packet has been sent.

The repository identifier field uniquely identifies the repository that the SCM cache entry relates to. As described below, a cluster node 102 may receive notification that SCM cache entries for a certain repository are invalid. In this case the invalid SCM cache entries are identified by reference to the repository identifier field.

Together, the key and repository uniquely identify a cache entry—i.e. an entry that relates to a specific request made with respect to a specific repository.

The response field stores the actual SCM response that has been cached (or a link/pointer thereto) in the local file system of the cluster node 102.

The expiry timestamp field stores the time at which the SCM cache entry expires, after which it is no longer considered valid.

The state field indicates the current state of the SCM cache entry. States are described in the following section.

The statistics field stores the created date, last accessed date, size in bytes, and number of hits for the SCM cache entry. These statistics are used to determine which SCM cache entry or entries to evict from the SCM cache when it grows too large.

SCM Cache Entry States

Many SCM cache operations (for example writing/streaming a response from a SCM server process 120 into the cache 114) can take considerable time. In order to manage concurrent accesses to the same SCM cache entry and to ensure that SCM requests do not hit on a SCM cache entry that has been created but that has not yet finished writing, a state machine for each SCM cache entry is maintained.

In this particular example, the state machine is maintained by use of the state field in the SCM cache entry data structure which stores the current state of a SCM cache entry.

Figure 7:
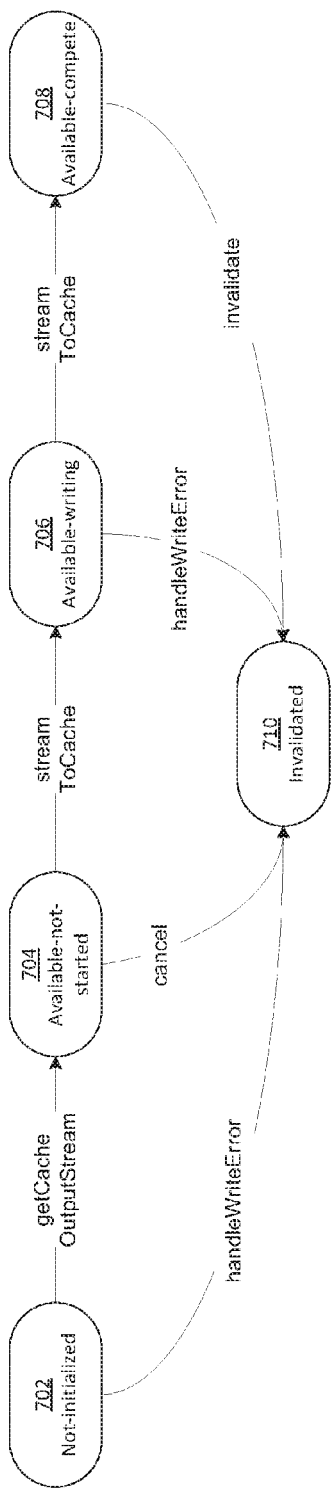
FIG. 7 is a state transition diagram illustrating SCM cache entry states.

FIG. 7 is a state transition diagram 700 showing the states a SCM cache entry may take and the transitions between those states.

All SCM cache entries are created in a not-initialized state 702.

When a response is being cached, a cache method 122 creates an output stream to a file on the local file system of the cluster node 102. If more than one thread attempts to populate a SCM cache entry at the same time (i.e. the same key has been generated by two cache methods and both are trying to cache the associated response), exactly one thread is permitted to create the output stream. That thread also transitions the state of the SCM cache entry to the available-not-started state 704.

When streaming data into the cache entry, the SCM cache entry is transitioned to the available-writing state 706, and the response field of the SCM cache entry contains at least a portion of the SCM response (the portion growing as more data is streamed to the cache entry). Once a SCM cache entry is in the available-writing state, the currently cached portion of the SCM response becomes available to other cache methods 122 to (if necessary) begin serving the response back to SCM clients 116. Any other cache method(s) 122 serving SCM clients 116 from a SCM cache entry in the available-writing state can only send as many bytes of the response as are available (i.e. as many bytes as have been received and cached), and must wait until the complete response has been cached (at which point the SCM cache entry transitions to the available-completed state) before the complete SCM response can be sent. Allowing cache methods 122 to access an incomplete cache entry (i.e. a cache entry that data is still being streamed into) in order to start responding to a request reduces latency that may otherwise occur when handling concurrent SCM requests with caching.

Once writing the cache entry is complete, the SCM cache entry is transitioned to the available-completed state 708. Once a SCM cache entry is in the available-completed state, the complete cached response can be accessed by other cache methods 122 to serve back to SCM clients 116, without waiting.

SCM cache entries may also transition into an invalidated state 710. This may occur, for example, if an I/O error occurs while creating an output stream or streaming data into the cache. An entry may also transition to the invalidated state 710 from the available-completed state 708, though in this case the transition only occurs after all in-flight read operations are complete.

Cluster Notifications

Certain SCM operations result in changes being made to the repository 114 (for example, in the Git context, push operations committing new/modified data to the repository 114). Where changes are made to the repository 114, any SCM cache entries that include pre-modification repository data become stale and must be invalidated from the SCM caches on all cluster nodes 102. This is to prevent a cached response which no longer reflects the state of the repository 114 from being served to a SCM client 116.

Accordingly, and as described further below, for certain SCM request types the cache method 122 monitors the SCM protocol communication and if a cache invalidation event occurs operations are performed which result in all cluster nodes 102 being notified that the repository 114 has been modified.

In the present examples, any operation that causes the repository 114 to be changed may be a cache invalidation event. In the Git context, for example, this may be the result of a push operation in which a SCM client 116 commits new or modified data to the repository.

In order to notify cluster nodes 102 of an invalidation event, a distributed hash table notification system is used. The distributed hash table notification system is implemented on a standard distributed hash table software component that maintains (key, value) pairs visible by all cluster nodes 102. Table B below provides one example of a notifications distributed hash table:

TABLE B

Notifications distributed hash table

| Notification name | Marker |
|---|---|
| cache-clear:2416/refs\| | 29f60e1c-09b9-433e-a600-9a55816b6d19_8 |
| cache-clear:all | 29f60e1c-09b9-433e-a600-9a55816b6d19_19 |
| config.changed | 9885fdb1-24ad-4a4e-8436-fd3912da7022_2 |

A notification hash table entry comprises a notification name and a marker.

The notification name identifies a set of SCM cache entry or entries that require invalidation.

If the notification name is a character string of the form "cache-clear<repository-id>/<key>", then it refers to the specific SCM cache entry with the key <key> for the repository identified by <repository-id>.

If the notification name is the character string "cache-clear:all", then it refers to all SCM cache entries for all repositories.

If the notification name is the character string "config.changed", then it refers not to a specific SCM cache entry or entries but to the configuration of the SCM cache itself, as described in the following section.

Each notification name maps to a marker which is used to indicate that any SCM cache entry or entries matching the notification name should be invalidated (e.g. due to changes having been made to a repository 114).

When a cache method 122 intercepts SCM operations that could require cached responses to be invalidated (e.g., in the Git context, a push command that modifies a repository), it generates and writes an entry into the distributed notifications hash table. The entry comprises the notification name identifying a set of SCM cache entry or entries to be invalidated and an associated marker. The marker takes the form "<cluster-node-id>_<version>" where <cluster-node-id> is the unique identifier of the cluster node 102 and <version> is a unique version number of the invalidation event, which increments by one for every notification generated by the cluster node 102. The cluster node identifier and version number together serve to uniquely identify every notification, so that each cluster node 102 can distinguish notifications originating from both local and remote cluster nodes and ensure that the appropriate invalidation actions are performed for all of them.

Once the notification hash table entry has been added, all cluster nodes 102 that have subscribed to the corresponding notification name will receive an invalidation event which is acted on by invalidating any SCM cache entry or entries identified by the notification name. Cluster nodes 102 can subscribe to events from the distributed hash table using the ordinary event subscription mechanism available with the distributed hash table data structure.

By way of example, in the Git context suppose a push operation that modifies a repository with unique identifier "2416" is processed by a cluster node 102 with unique identifier "29f60e1c-09b9-433e-a600-9a55816b6d19". This causes the cache method 122 on that cluster node to invalidate any SCM cache entry with repository identifier "2416" and key "refs|" in its local SCM cache 124. In addition, the cache method 122 creates a notification comprising the name "cache-clear:2416/refs|" and marker "29f60e1c-09b9-433e-a600-9a55816b6d19_8", and writes it into the distributed hash table which in turn triggers an invalidation event to be sent on all cluster nodes 102 that have subscribed to the "cache-clear" notification type. When the other cluster nodes 102 receive the invalidation event, they check the marker in the notification to confirm that the notification originated from a different cluster node. They then invalidate any SCM cache entry with repository identifier "2416" and key "refs|" in their local SCM caches 124. Any SCM cache entries with different keys (e.g., "clone|3c4ef7cff84ca3fd6e0f86d3bf97dc4e" or other) are not invalidated, as any such key includes sufficient data from the SCM request (i.e., the wants, capabilities, and deepen lines) that the same SCM request with the same data will still result in the same SCM response, and is not considered stale.

SCM Cache Configuration

The caching operations described herein also make use of SCM cache configuration information.

The SCM cache configuration information comprises operational parameters used by cluster nodes 102 and cache methods 122. These parameters include, for example: the SCM transport protocol(s) over which the cache methods 122 will apply caching; the SCM request type(s) that cache methods 122 will treat as being cacheable; the time to live (TTL) applied to cached responses of each cacheable SCM request type; a maximum number of responses that can be cached for each cacheable SCM request type and repository.

In certain embodiments (in the Git context) the SCM cache configuration information distinguishes two types of SCM responses may be cacheable: "refs" for reference advertisements and "upload-pack" for both negotiation and packfile responses. The SCM cache configuration allows caching to be enabled or disabled individually for "upload-pack" and "refs" responses; caching to be enabled or disabled over the "SSH" and "HTTP" protocols; TTLs for "upload-pack" and "refs" responses, and the maximum numbers of "upload-pack" and "refs" responses. By way of example, in one specific instance, the SCM cache may be configured to enable caching of both "upload-pack" and "refs" responses, over both SSH and HTTP, with a TTL of 4 hours (14400 seconds) for "upload-pack" responses and 3 minutes (180 seconds) for "refs" responses, and a maximum of 3 "upload-pack" responses per repository and 1 "refs" response per repository.

Cache configuration information is persistently stored on database 108. When a cluster node 102 is provisioned the cluster node accesses the database 108 and creates a local copy of the cache configuration information (e.g. in cache 114).

Cache configuration information may be modified/updated by a user on any one of the cluster nodes 102. Modification of the cache configuration information on a cluster node 102 causes an update to be made to the cache configuration information persistently stored in the shared database 108.

In some embodiments, the notifications distributed hash table described above is also used to inform cluster nodes 102 when cache configuration information has changed. In this case, when cache configuration information is modified on a cluster node 102 a notification with name "config.changed" is also added to the notifications hash table. This, in turn, generates events on all cluster nodes 102 which cause each cluster node 102 to invalidate its cached configuration information and reload it from the shared database 108.

Input Stream Buffer

In some instances one or more initial SCM requests in a SCM connection will result in cache hits (i.e. be requests for which responses can be served from the cache 114) but a following request on the same connection will result in a cache miss (i.e. a request for which a response cannot be served from the cache 114). In this case a SCM server process 120 must be started to handle the request.

In order to account for this possibility, each cache method 122 also maintains its own input stream buffer in which intercepted SCM requests are buffered. In the event that one or more cache hits are followed by a cache miss the entire input stream is replayed to the SCM server process 120 that is started (with any responses already served to the SCM client 116 by the cache method 122 being discarded).

The input stream buffer for a given cache method 122 is stored in local memory of the cluster node 102 on which the cache method 122 is running. All cache methods 122 maintain their own input stream buffer and the input stream buffer of a given cache method 122 is not accessed by/available to other cache methods 122 (whether running on the same or a different cluster node 102).

Cache Size Management

In order to prevent a cache 124 on a given cluster node 102 growing too large, the cache configuration parameters define an upper limit to the number of SCM responses that can be cached for each type of SCM request.

If the upper limit for a given type of response is ever reached, cached responses are invalidated according to a least recently used (LRU) policy.

Cluster Topology Changes

In certain embodiments, if any significant change occurs to the cluster topology (e.g. a cluster node leaves and rejoins the cluster) operations are performed to clear the entire SCM cache of that node. This is done as a precaution against the cluster node 102 missing invalidation events while not correctly registered as a cluster member.

Caching Implementation Example

This section describes one implementation of handling a SCM connection using a cache method. The example implementation will be described with reference to FIGS. 5 and 6.

Operations are described as being performed by a cache method 122. Unlike the "normal" server operation described above (with respect to FIG. 3), on a SCM connection being established with a SCM client 116 the server 112 does not automatically start a SCM server process 120. Instead, the server 112 starts a cache method 122 which directly monitors the SCM protocol communication stream and (as described in detail below) performs actions accordingly.

At 502, the cache method 122 intercepts a SCM request communicated by a SCM client 116. As per the example above, in the Git SSH context initiation of a SCM connection and communication of an initial SCM request may occur at the same time—e.g. in a ssh user@host "git-upload-pack '/project/repository.git'" SCM client 116 command.

At 504, the cache method 122 adds the intercepted SCM request to the input stream buffer. The input stream buffer is maintained so that in the event that one or more cache hits are followed by a cache miss, the entire input stream for the SCM connection can be replayed to a SCM server process 120.

At 506, the cache method 122 determines if the intercepted SCM request is a cacheable request type. Cacheable request types are defined by cache configuration data as described above. In some cases a SCM request may comprise multiple messages/communications from the SCM client 116 that are combined to be, in effect, a single request. If the SCM request is a cacheable request type the process proceeds to 508. If not the process proceeds to 602.

At 508, following determination that the intercepted SCM request is potentially cacheable, the cache method 122 generates a key. As described above, the key is generated based on data included in the request. The specific request data used to generate the key depends on the type of request and in the present embodiment a MD5 cryptographic hash function is applied.

At 510, the cache method 122 checks the SCM cache entry data structure stored on the local cache 124 to see if a SCM cache entry matching the request received at 502 exists. A matching SCM cache entry is a cache entry that has a key matching the key generated at 508 and a repository identifier matching the repository identified in the request. If a SCM cache entry matching the request exists the method proceeds to 512. If not the method proceeds to 522.

At 512, a SCM cache entry matching the request has been identified. In this case the cache method 122 determines if the matching SCM cache entry identified at 510 is valid. SCM cache entries may be invalid for various reasons. For example, cached responses have a time to live which is defined in cache configuration information as described above, and when a response is initially cached its expiry time is computed and recorded. If the cache method determines a response has exceeded its time to live the cached response is invalid. If the cache method 122 determines the cached response identified at 508 is valid, the process proceeds to 514. If not the process proceeds to 520.

As noted above, a SCM cache entry may also have other states (such as available-writing state 706) which while not indicative of an invalid SCM cache entry per se indicate that the SCM cache entry cannot immediately be used. If a SCM cache entry is in this state the cache method 122 delays until the SCM cache entry either transitions to the valid state 708 (i.e. available-completed state) or the invalidated state 710.

At 514, a valid SCM cache entry matching the request has been identified. In this case the cache method 122 determines whether a SCM server process 120 in respect of the current SCM connection is running. Typically this will not be the case, but a SCM server process 120 may be running if, for example, a previously received SCM request resulted in a cache miss (e.g. due to a SCM cache entry having expired) but the current SCM request has resulted in a cache hit.

If, at 514, a SCM server process 120 in respect of the current SCM connection is running it is terminated at 516 and the cache method proceeds to 518. If, at 514, no SCM server process 120 is running, the process proceeds directly to 518.

At 518, the cache method 122 retrieves the cached response to the SCM request from the local cache 114 and serves/communicates this to the SCM client 116 that made the SCM request. In this case the SCM request has been handled without starting/relying on a SCM server process 120. The process then proceeds to 544.

Returning to determination 512, the cache method may determine that a SCM cache entry exists but is not valid. In this case, at 520, the cache method 122 removes the SCM cache entry identified at 514 from the SCM cache (and, if stored separately, deletes the associated cached response). The cache method then proceeds to 522.

At 522, either no SCM cache entry matching the request has been identified (at determination 510) or an invalid SCM cache entry matching the request has been identified (at determination 512). In this case the cache method 122 checks to see if a SCM server process 120 in respect of the current connection is currently running. A SCM server process 120 will already be running if a previous SCM request in the connection resulted in a cache miss. Conversely, a SCM server process 120 will not be running if the SCM request is the first request in the connection, or if the immediately preceding request in the connection resulted in a cache hit. If, at 522, a server process 122 in respect of the SCM connection is not running the process proceeds to 524. If a SCM server process in respect of the SCM connection is running the process proceeds to 540.

At 524, a cache miss has occurred and there is no SCM server process in respect of the SCM connection running. In this case a SCM server process 120 is started and a buffer replay process (involving steps 526, 528, 530, 532, and 534) is performed.

At 526, the cache method 122 retrieves the next SCM request from the input stream buffer. The next SCM request is the earliest SCM request in the input stream buffer that has not been replayed to the SCM server process 120. Initially, the next SCM request will be the very first SCM request received in the SCM connection.

At 528, the cache method 122 passes the SCM request retrieved from the buffer at 526 to the SCM server process 120. The SCM server process 120 handles the request as normal (e.g. as described above with respect to FIG. 3).

At 530, the cache method 122 intercepts the response to the SCM request from SCM server process 120.

At 532, the cache method determines whether the SCM request most recently passed to the SCM server process (at 528) is the last SCM request in the input stream buffer, or if there are one or more additional SCM requests in the input stream buffer. If there are one or more additional SCM requests in the input stream buffer the process proceeds to 534. If not the process proceeds to 536.

At 534, additional SCM requests exist in the input stream buffer. In this case the cache method 122 discards the response intercepted at 530 and does not communicate it to the SCM client 116. This is to account for the fact that a response to the request will already have been served to the SCM client 116. Once the response is discarded the process returns to 526 to retrieve the next SCM request in the input stream buffer.

At 536, there are no additional SCM requests in the input stream buffer—i.e. the protocol passed to the SCM server process at 528 is the final/most recent request in the input stream buffer. In this case the response last intercepted at 530 is not one that has been previously seen so the cache method 122 caches it. Caching the response involves the cache method 122 writing a SCM cache entry to the SCM cache 124. The SCM cache entry comprises, in the present embodiment: the key generated at 508, the repository identifier, the response intercepted at 530, the expiry timestamp, the state, and statistics as described above.

At 538, after caching the SCM response, the cache method 122 communicates/serves the SCM response to the SCM client 116. The process then proceeds to 544.

At 540, a cache miss has occurred but a SCM server process 120 is already running. This will occur if the request in the connection also resulted in a cache miss. In this case any previous SCM requests of the connection (i.e. previous to the last SCM request intercepted at 502) will already have been passed to the SCM server process 120 that is running (and responses to those requests will have been cached (if appropriate) and passed to the SCM client 116). Accordingly, at 540 only the last/most recent SCM request in the input stream buffer is passed to the SCM server process 120.

At 542, the cache method 122 intercepts the SCM server response to the SCM request passed at 540, caches that response at 536, and communicates the response to the SCM client 116 at 538. The process then proceeds to 544.

Where the SCM request intercepted at 502 is a cacheable type of request and a response to the request has been served to the SCM client 116 (either from the cache 114 at 518 or passing the response on from a SCM server process at 538), the method proceeds to 544. At 544, the cache method 122 determines if the SCM connection with the SCM client 116 has ended. If the SCM connection has ended the cache method 122 clears the input stream buffer at 546 and the process is complete. If the SCM connection has not ended the process returns to 502 and a further request/message from the SCM client 116 is intercepted and processed.

If all of a SCM client's SCM requests in a connection result in cache hits, the entire connection is handled without starting a SCM server process 120. This serves to avoid the potentially significant processing by the SCM server process 120 and communications between the SCM server process 120 and shared file server 106 that would otherwise have been performed. Conversely, if not all SCM requests in a SCM connection can be answered from the local cache 124, a SCM server process 120 is started in order to handle the SCM requests (and, for those requests which are cacheable, to populate the local cache 114 with the relevant responses). As the cache method 122 monitors the SCM protocol communication stream directly, however, very little latency is added in the cache miss case.

Figure 6:
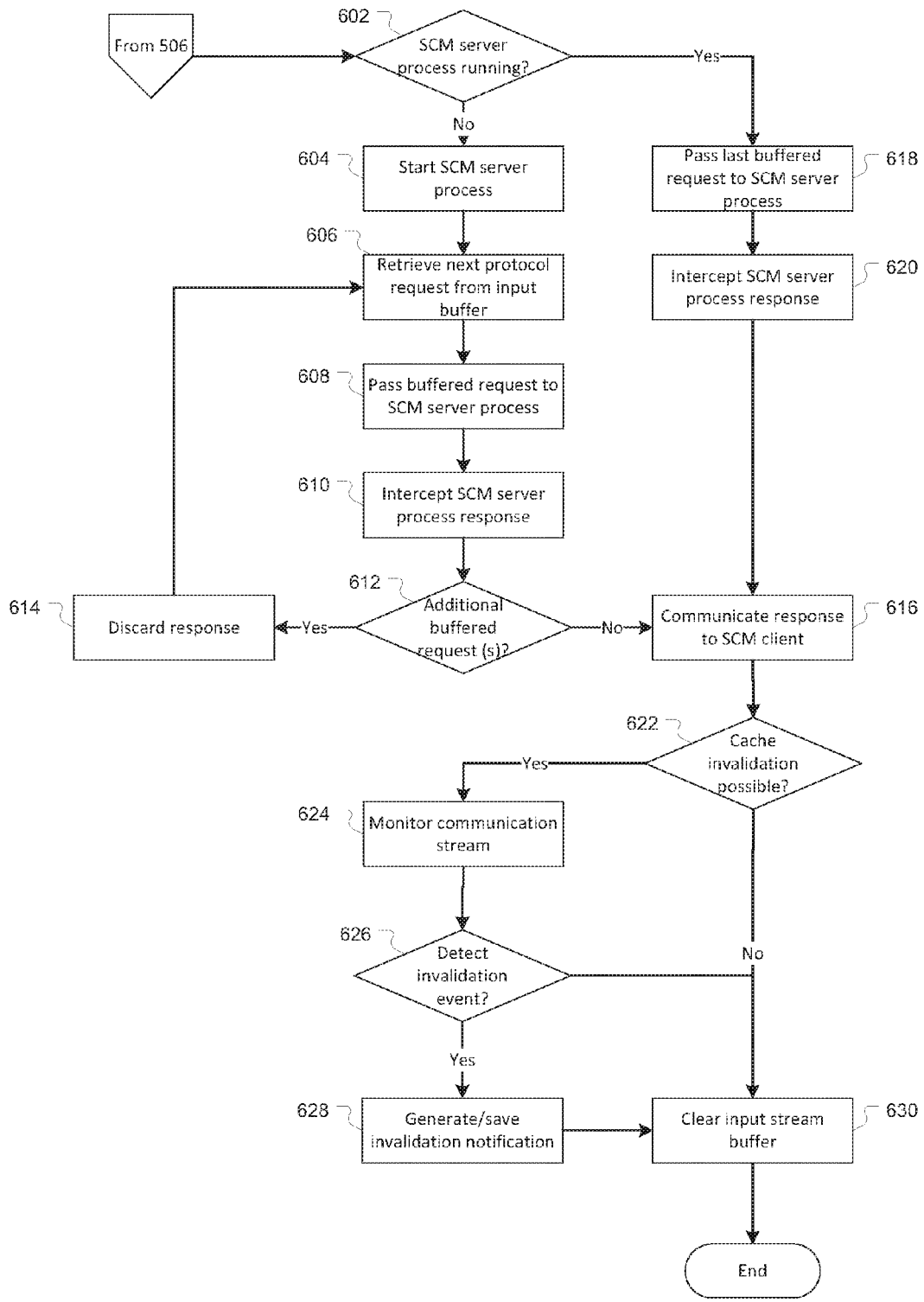

Returning to determination 506, if the SCM request is determined not to be a cacheable request type the process proceeds to 602 (see FIG. 6). In this case the SCM connection is handled as normal by a SCM server process 120 but may be monitored by the cache method 122 to determine if an invalidation event occurs.

At 602, the cache method determines if a SCM server process in respect of the connection is already running. This determination is similar to the determination made at 522. A SCM server process 120 will already be running if a previous SCM request in the connection resulted in a cache miss. Alternatively, a SCM server process 120 will not be running if the SCM request is the first request of the connection, or if the preceding request in the connection resulted in a cache hit.

If, at 602, a SCM server process 120 in respect of the SCM connection is not running a buffer replay process is performed. The buffer replay process involves the same or similar steps to 524, 526, 528, 530, 532, 534, 538, 540 and 542 described above—accordingly these steps will not be described in detail again. Notably, though, due to the determination at 506 that the request is not a cacheable type of request none of the responses are cached (i.e. there is no equivalent to step 536).

In short: at 604 a SCM server process is started; at 606 the next SCM request is retrieved from the buffer; at 608 the retrieved SCM request is passed to the SCM server process; at 610 the response is intercepted; at 612 the cache method 122 determines if one or more later SCM requests are stored in the input stream buffer. If one or more later SCM requests are stored in the input stream buffer, the intercepted response is discarded at 614. If no later SCM requests are stored in the input stream buffer (i.e. the SCM request passed to the SCM server process at 608 is the last/most recent request in the input stream buffer), the response intercepted at 610 is communicated/served to the SCM client 116 at 616. The process then proceeds to 622.

If, at 602, a SCM server process 120 in respect of the SCM connection is not running: the last/most recent request in the input stream buffer is passed to the SCM server process 120 at 618 (similar to step 540 described above); the response to the request is intercepted at 620 (similar to step 542 described above); and the response is communicated/served to the SCM client 116 at 616.

At 622, once the input stream buffer has (if necessary) been replayed, the SCM server process 120 that is running handles the rest of the SCM requests for the connection. Although in this case the cache method 122 does not need to store/identify cached responses, the cache method 122 may need to monitor the protocol communication stream in order to detect whether the repository 114 is changed and therefore that cached responses may need to be invalidated. To this end, at 622 the cache method 122 determines if the SCM request intercepted at 502 is of a request type that may result in cached responses needing to be invalidated. By way of example in the Git context, this will be the case if the command is a git-receive-pack command.

If the SCM request is of a type that may result in cached responses needing to be invalidated the process proceeds to 624. If not the process proceeds to 630 where the input stream buffer is cleared and the cache method ends.

At 624, the cache method 122 monitors the SCM communication stream.

At 626, the cache method 122 determines if a protocol communication relates to an invalidation event—for example a protocol communication indicating that the repository 114 has been changed. If an invalidation event is detected, the cache method 122 generates an invalidation notification at 628. This involves writing an entry to the notifications distributed hash table data structure, comprising a notification name that uniquely identifies the repository and SCM cache key, and a notification marker that identifies the current cluster node 102. The notification entry in turn triggers the remaining cluster node(s) 102 to invalidate any stale SCM cache entry or entries matching the same repository and key.

Following generation of the invalidation notification at 628, or if the connection with the SCM client 116 ends without an invalidation event being detected, the process proceeds to 630 where the input stream buffer is cleared before the process ends.

Figure 5:
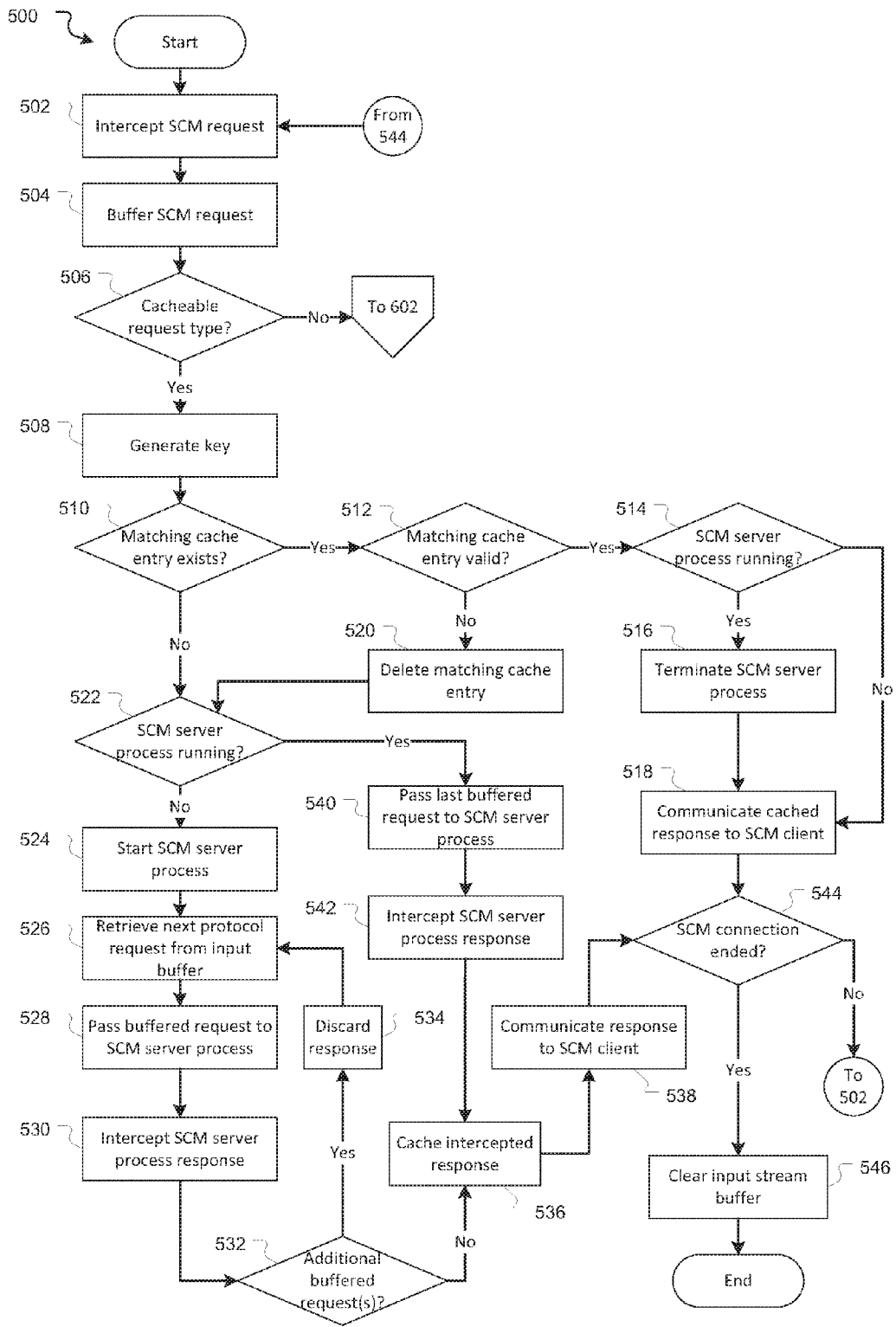
FIG. 5 and FIG. 6 is a process for handling SCM requests which implements caching capabilities.

The functions described with respect to FIGS. 5 and 6 involve processes operating on a cluster node 102 (such as server 112, cache methods 122, and SCM server processes 120) receiving data communications from other computers, processing data, accessing data on local storage, and communicating data. Generally speaking, data communications from/with another computer (such as a SCM client 116/load balancer 110 or shared file server 106) are received by/communicated via a communications interface 218 of the cluster node 102. Data is processed by one or more processors 204 of the cluster node 102. Data is accessed from/written to locally accessible storage such as 206 or 210 by operation of one or more processors 204.

Example Implementation: Git SCM

In order to further illustrate cache operations features, this section describes a specific implementation for dealing with Git clone and fetch operations.

Figure 8:
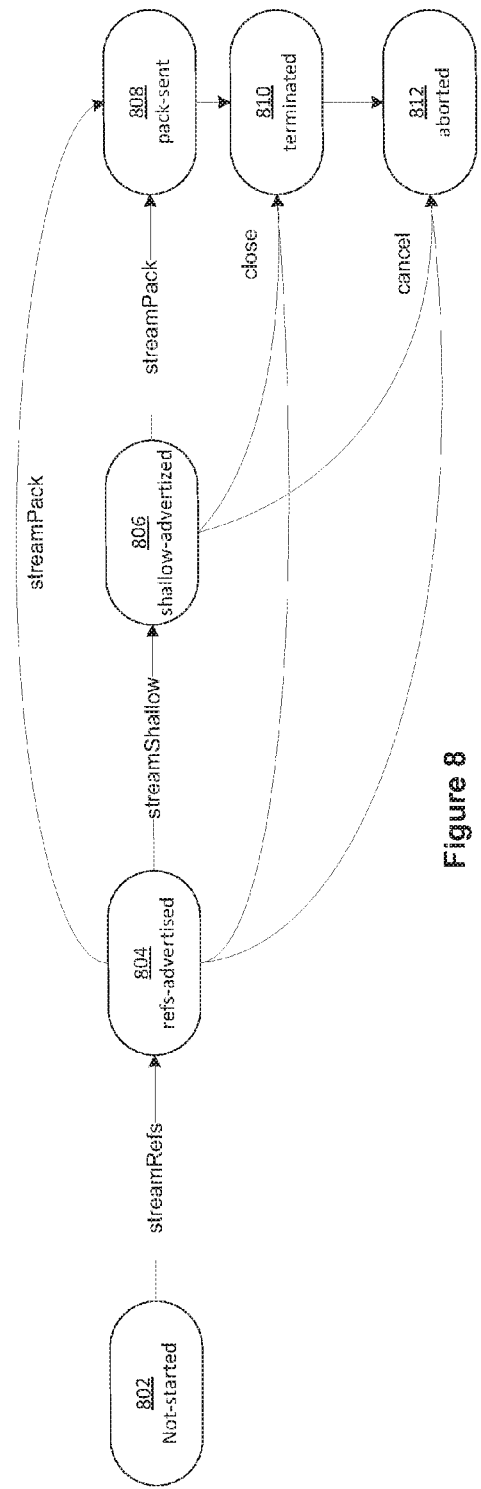
FIG. 8 is a state transition diagram illustrating SCM connection states; and FIG. 9A

In this implementation, cache methods 122 maintain a state machine for each connection in order to monitor the SCM protocol communication between the SCM client 116 and the SCM server process 120 and capture/inject the correct responses. FIG. 8 depicts the state machine for a Git "clone" or "fetch" SCM operation and this is described below.

An incoming SCM request is created in a not-started state 802. As described above with reference to FIG. 3, "clone" and "fetch" operations in the Git SCM always involve some preliminary negotiation between the SCM client 116 and the server 112. Specifically, the server 112 determines the references/objects available and advertises these to the SCM client 116. Reference advertisements are cacheable and as such the cache method 122 operates to see whether a valid cached response exists. If a cache miss occurs, the request is handled by a SCM server process 120 (as per steps 306, 308, and 310 of FIG. 3) and the cache method 122 intercepts and caches the reference advertisement response which can then be used to serve subsequent requests that hit. If a cache hit occurs the reference advertisements are served by a cache method 122 (without recourse to a SCM server process 120).

Once the references have been advertised (whether from the cache 124 or from a SCM server process 120) the SCM request is transitioned into the refs-advertised state 804.

On receiving the reference advertisement the SCM client 116 responds with a negotiation request advising the server 112 what, if any, object name(s) it already has and the ones it wants (312 of FIG. 3).

As described above, in the Git SCM a client 116 may optionally request a "shallow clone" (by including a "deepen" line in the negotiation request) which truncates the history of older versions at a specified limit. This is in contrast to a "full clone" that where the complete history is requested.

If the SCM client 116 requests a shallow clone (identified, for example, by checking for the existence of a "deepen" line in the negotiation request received from the SCM client 116), then the server 112 sends a negotiation response consisting of "shallow/unshallow" lines which tell the SCM client 116 where the history was truncated. Negotiation responses are cacheable and as such the cache method 122 operates to see whether a valid cached response exists. If a cache miss occurs, the request is handled by a SCM server process 120 (as per steps 316, 318, and 320 of FIG. 3) and the cache method 122 intercepts and caches the negotiation response. If a cache hit occurs the negotiation response is served by the cache method 122 (without recourse to a SCM server process 120).

Once the shallow response has been sent to the SCM client 116 (whether from the cache 124 or from a SCM server process 120), the SCM request transitions to the shallow-advertised state 806.

Finally, in a Git SCM "clone" or "fetch" operation the repository data itself is transferred in a "packfile". Packfiles are only served to the SCM client 116 if the SCM request is in the refs-advertised state 804 or shallow-advertised state 806. Packfiles are cacheable, and as such the cache method 122 operates to see whether a valid cached response exists. If a cache miss occurs, the request is handled by a SCM server process 120 (as per steps 324, 326, 328, and 330 of FIG. 3) and the cache method 122 intercepts and caches the packfile response. If a cache hit occurs the packfile is served by the cache method 122 (without recourse to a SCM server process 120).

Once the packfile response has been sent to the SCM client 116, the SCM request moves to the pack-sent state 808.

As described above, starting a SCM server process 120 is delayed until and if it is actually needed to service a cache miss. While the SCM request is being serviced by the cache method 122 from the cache 124, the entire client input stream is buffered in memory, ready to be replayed to a SCM server process 120 in case of a later cache miss. If the cache method 122 hits on all client requests on the one connection, then all responses are serviced directly from the cache 114. In this case no SCM server process 120 is started and the buffered client input can be discarded. But if one or more cache hits on a connection occur (for example a reference advertisement hit and a negotiation response hit) and are later followed by a cache miss (for example, on the packfile), then a SCM server process 120 must be started. In this case the entire client input stream is replayed to the SCM server process 120, and any unnecessary responses (in this example, the reference advertisement response and the negotiation response that were already serviced from the cache 114) are discarded until the desired point in the stream is reached. Delayed start of a SCM server process 120 can avoid execution of some SCM server processes altogether, if all parts of the SCM request hit in the cache.

If at any point the SCM client 116 sends a SCM request that is not recognized by a cache method 122, or if the SCM cache decides based on the type of SCM request that there would be little value in caching the response, the cache method 122 is bypassed (in the sense that the cache method 122 streams the request to the SCM server process 120 and streams the responses back to the SCM client 116 uninterrupted). In addition the cache method 122 is bypassed if the amount of free space available on the local file system of the cluster node 102 falls below a certain threshold.

If at any point the SCM client 116 closes its side of the connection (for example, because it is only interested in the ref advertisement), the SCM request transitions into the terminated state 810.

If the SCM request is canceled (for example, due to an error or exhaustion of resources), the SCM request transitions to the aborted state 812.

Example Walkthrough: Git SCM Git-Upload-Pack Commands

This section provides a high-level walkthrough of the processing that occurs when two identical full clone operations are successively received by the same cluster node 102. This walkthrough is again based on the Git SCM and the particular implementation described above.

Figure 9A:
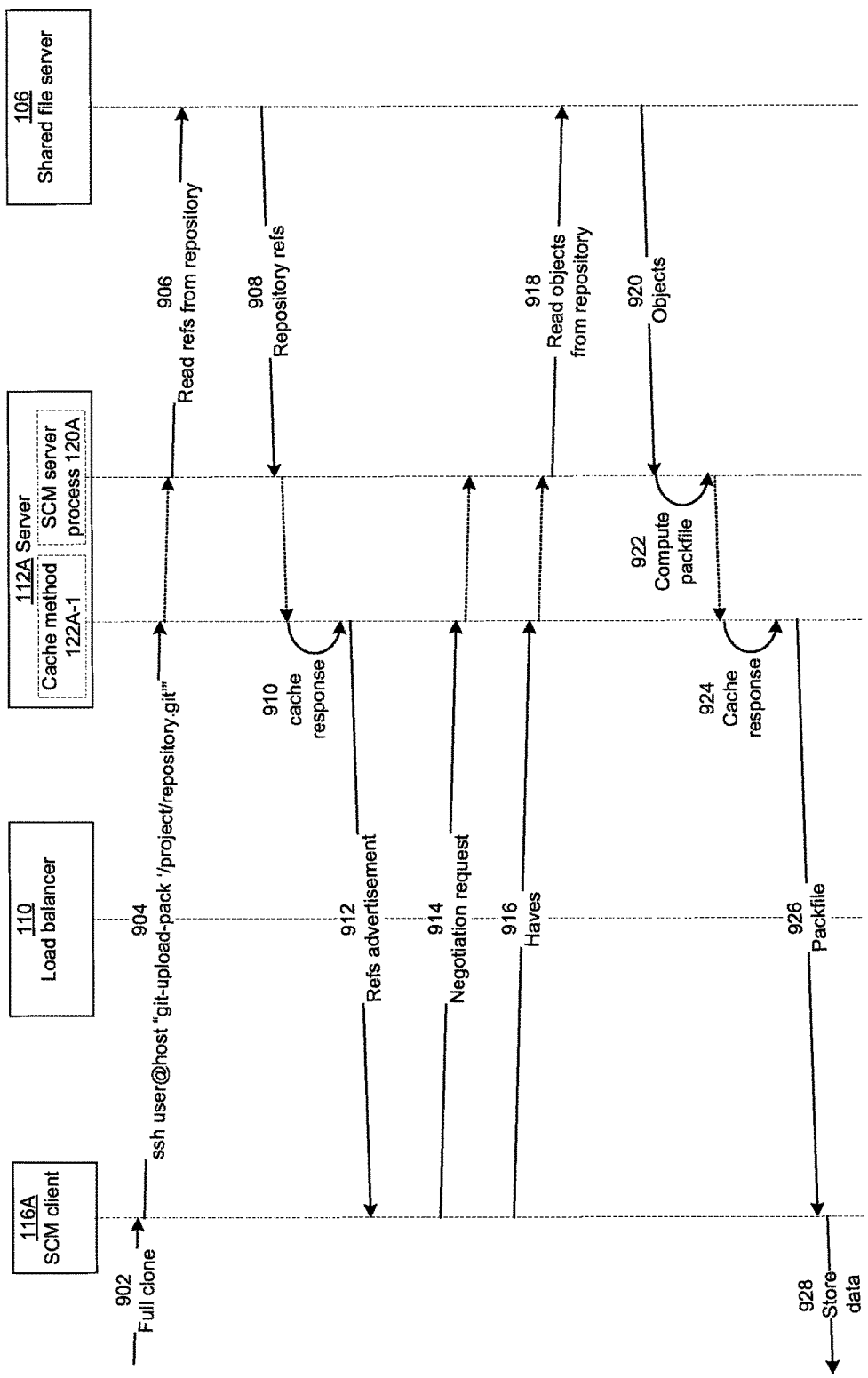
FIG. 9B is a message passing diagram illustrating communications in handling example SCM requests.
Figure 9B:
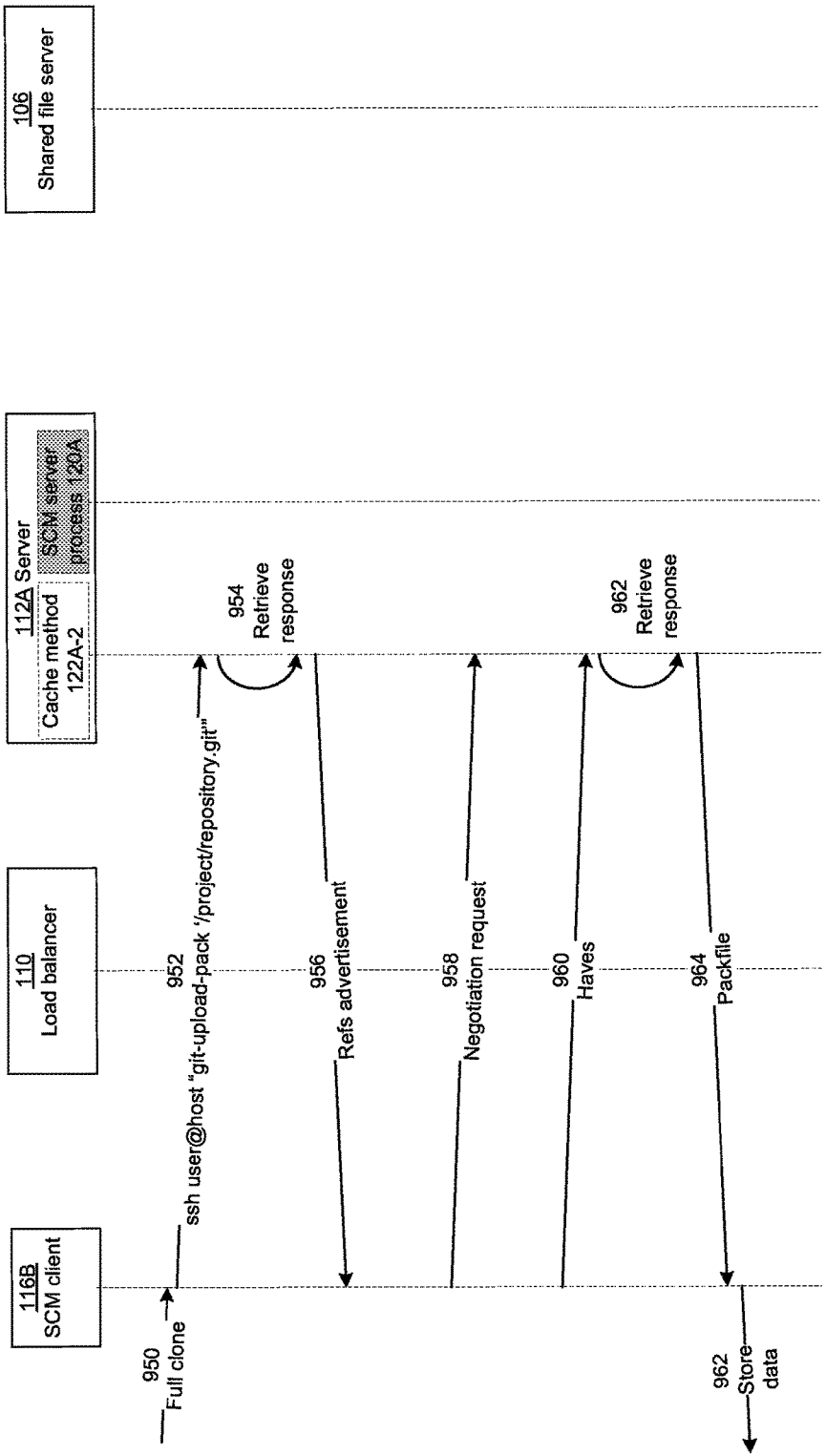

The walkthrough will be described with reference to message passing diagrams 900 of FIGS. 9A and 9B: FIG. 9A shows operations/communications performed on a first full clone operation initiated by SCM client 116A and handled by server 112A on cluster node 102A. FIG. 9B shows operations/communications performed on a subsequent full clone operation made by SCM client 116B and handled by server 112A on cluster node 102A.

First Git-Upload-Pack Command

The walkthrough starts with a full clone operation being issued at a SCM client 116A (see 902). This results in a connection being established and a git-upload-pack command being invoked (see communication 904). The connection is established via load balancer 110, in this instance with server 112A.

The server 112A starts a cache method 122A-1 which: intercepts/receives the git-upload-pack request at 502; buffers the request in the input stream buffer at 504; determines that the request type is cacheable at 506; and generates a key for the request (the key at this stage being the character string "refs|" and not depending on any other information in the request).

For present purposes it is assumed that this is the first git-upload-pack command received by the server 112A. Accordingly, at 510 no SCM cache entry matching the request is identified. Accordingly, the cache method 122A: determines that no SCM server process is currently running at 522 (as this is the first request of the connection); starts a SCM server process 120A at 524; retrieves the next (and in this instance sole) SCM request from the input stream buffer at 526; and passes the buffered git-upload-pack command to the SCM server process 120A at 528.

Processing of the git-upload-pack command by the SCM server process 120A is as described in FIG. 3: references are read from the shared file server 106 at 306 (see communication 906); the shared file server 106 returns the repository references (see communication 908), the response received by the SCM server process 120A at 308; and the SCM server process 120A advertises the references at 310.

Once the SCM server process 120A has advertised the references, the cache method 122A-1: intercepts the advertised references response from the server at 530; determines there are no additional requests buffered at 532; caches the advertised references response at 536 (see operation 910); and communicates the response to the SCM client 116A at 538 (see communication 912).

At 544 the SCM connection has not ended so the process returns to 502.

The SCM client 116A receives the references advertisement and then sends a negotiation request to the server 112A (see communication 914). In this case the SCM operation is a full clone so the negotiation request includes wants for all references advertised, no shallow lines, and no deepen line. (The negotiation request also includes the capabilities that the SCM client 116A wishes to be enabled.) Furthermore, as it is a full clone operation (and no deepen line is made) the SCM client 116A follows the negotiation request with a haves message (see communication 916) which in this case is empty—i.e. the client does not currently have any of the objects it wants.

The SCM request (comprising the negotiation request and haves list) is intercepted by the cache method 122A-1. Processing by the cache method involves: buffering the request at 504; determining it to be a cacheable request type at 506; generating a key at 508 (the key being generated based on data in both the negotiation request and the haves list); determining no cached response matching the request exists at 510; determining a SCM server process 120A to be already running; and passing the last/most recent request in the buffer to the SCM server process 120A at 540 (the most recent request comprising both the negotiation request communication and haves communication).

Processing of the negotiation request and haves communication by the SCM server process 120A is as described in FIG. 3. The SCM server process: receives the negotiation request at 312; determines that a deepen line has not been made at 314 (e.g. by analyzing the negotiation request and noting it does not include a deepen line); receives the haves communication at 322; reads the required objects from the file server 106 at 324 (see communication 918); receives the objects from the shared file server 106 at 326 (see communication 920); computes the packfile at 328 (see operation 922); and outputs the packfile.

The cache method 122A-1: intercepts the packfile response at 542; caches the packfile (indexed by the key) at 536 (see operation 924); and communicates the packfile to the SCM client 116A at 538 (see communication 926). The SCM client 116A receives the packfile and stores the data on local storage (see operation 928).

At 544 the SCM connection has ended. The input stream buffer is cleared at 546 and the process ends.

Subsequent Git-Upload-Pack Command

Turning to FIG. 9B, the walkthrough continues with a full clone operation being issued at SCM client 116B (see 950). Load balancer 110 passes the connection to server 112A (i.e. the same server that handled the connection described in FIG. 9A, see communication 952).

For the example the particulars of the full clone operation (e.g. the repository being cloned, the capabilities the SCM client 116B requests to be enabled, etc.) are the same as for the clone operation issued by the SCM client 116A in FIG. 9A.

The server 112 starts a new cache method 122A-2. The new cache method 122A-2: intercepts the git-upload-pack command at 502; buffers the request at 504; determines that the request type is cacheable at 506; and generates a key for the request at 508 (in this case the character string "refs|").

At 510 the cache method 122A-2 identifies that a cache entry matching the request exists: i.e. an entry with the same key (in this case "refs|") and the same repository identifier. Accordingly, the cache method 122A-2: determines the SCM cache entry matching the request to be valid at 512 (the presumption for this example being that the TTL for the SCM cache entry has not expired and no other invalidation event has occurred); determines that there is no SCM server process currently running at 514; retrieves the cached reference advertisement response (see operation 954) at 516; and at 518 communicates the cached response to the SCM client 116B (see communication 956).

At 544, the SCM connection has not ended so the process returns to 502.

The SCM client 116B receives the references advertisement, generates/communicates a negotiation request and a haves message (see communications 958 and 960).

The cache method 122A-2: intercepts the request at 502 (comprising the negotiation request and haves list); buffers the request at 504; determines it to be a cacheable request type at 506; and generates a key at 508.

Once again the relevant content of the request (i.e. the negotiation request and haves message) is identical to those messages as sent by SCM client 116A and the same key is generated. Furthermore, the repository identified in the message is the same as the repository identified by client 116A.

Accordingly, the cache method 122A-2: identifies that a SCM cache entry (comprising a packfile) matching the request exists at 510; determines the matching SCM cache entry to be valid at 512; determines that there is no SCM server process currently running at 514; retrieves the cached packfile response (see operation 962) at 516; and at 518 communicates the cached packfile to the SCM client 116B (see communication 964).

At 544 the SCM connection has ended to the process is complete.

As can be seen, the server 112A has responded to the requests from SCM client 116B without initiating any SCM server process 120 and without reading data from the shared file server 106. This saves considerable CPU, memory, and shared file server resources compared with what would be consumed had the connection been handled by a SCM server process 120A.

Specific examples have been described above with reference to an underlying Git SCM system implemented using the SSH transport protocol. Other implementations are possible and, as noted above, specific implementation details are dependent on a number of variables including (for example) the underlying SCM system, the transport protocol, and the type of request being handled.

In the examples described above operations are described as being performed by a cache method 122 which is started by a server 112. A cache method 122 may involve a number of sub-processes. Furthermore, certain operations that are described as being performed by a cache method 122 may be performed by other processes/applications invoked by the server 112 or cluster node 102.

The various flowcharts illustrated in the figures and described above define steps in particular orders to explain various features. In some cases the steps may be able to be performed in a different order, one or more steps may be combined into a single step, a single step may be divided into multiple separate steps, and/or the function(s) achieved by one or more described/illustrated steps may be achieved by one or more alternative steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for operating a first cluster node and a second cluster node, the first and second cluster nodes being cluster nodes of a clustered source code management system, the method comprising:
by the first cluster node:
receiving one or more incoming discovery requests from one or more client computers, the one or more incoming discovery requests being source code management protocol requests to discover repository data stored on a shared file server of the clustered source code management system;
for each of the one or more incoming requests:
communicating the incoming discovery request to an external source code management server process;
in response to intercepting one or more negotiation messages between the requesting client computer and the clustered source code management shared file server, determining response data to send to the requesting client computer; accessing the determined data from the shared file server;
sending the determined data to the requesting client computer; and
storing the determined data as a cache entry on storage media locally accessible to the first cluster node, wherein the cache entry comprises a key that is generated by: extracting relevant information as one or more character strings from one or more of: the incoming discovery request and the one or more negotiation messages, and processing the extracted information using a cryptographic hash function to generate a unique key for the particular one or more character strings,
by the second cluster node:
receiving a further incoming request from a client computer, the further incoming request being a source code management protocol request;
determining that the further incoming request is in respect of a source code management protocol operation that involves a change being made to the repository data stored on the shared file server;
responsive to determining that the further incoming request is in respect of a source code management protocol operation that involves a change being made to the repository data stored on the shared file server, generating a cache invalidation notification, and
by the first cluster node:
receiving the cache invalidation notification; and
invalidating one or more of the cache entries stored by the first cluster node.

2. The computer implemented method of claim 1, wherein:
the second cluster node generates the cache invalidation notification by creating an entry in a distributed hash table; and
the first cluster node subscribes to the distributed hash table.

3. The computer implemented method of claim 2, wherein the entry in the distributed hash table comprises:
a notification name indicating the one or more cache entries that are to be invalidated; and
a marker comprising a unique identifier of the second cluster node.

4. The computer implemented method of claim 3, wherein the notification name comprises:
a repository identifier uniquely identifying a particular source code repository; and
the key identifying one or more cache entries in respect of the particular source code repository that are to be invalidated.

5. The computer implemented method of claim 3, wherein the notification name comprises an indication that all cache entries in respect of all source code repositories are to be invalidated.

6. The computer implemented method of claim 3, wherein the marker further comprises a unique invalidation event version number.

7. The computer implemented method of claim 1, wherein the further incoming request is in respect of a push operation.

8. A computer implemented method for operating a first cluster node, the first cluster node being one of a plurality of cluster nodes of a clustered source code management system, the method comprising:
receiving an incoming request from a client computer, the incoming request being a source code management protocol request;
determining that the incoming request is in respect of a source code management protocol operation that involves a change being made to repository data stored on a shared file server of the clustered source code management system; and
responsive to determining that the further incoming request is in respect of a source code management protocol operation that involves a change being made to the repository data stored on the shared file server, generating a cache invalidation notification, wherein:
the cache invalidation notification causes at least a second cluster node of the plurality of cluster nodes to invalidate one or more second cluster node cache entries;
each second cluster node cache entry is a cache entry stored by the second cluster node on storage media locally accessible to the second cluster node; and
each second cluster node cache entry comprises a response to a separate incoming discovery request, each separate incoming discovery request being a source code management protocol request received by the second cluster node from a client computer and being a request to discover repository data stored on the shared file server,
wherein, in response to intercepting one or more negotiation messages between the requesting client computer and the clustered source code management shared file server,
determining response data to send to the requesting client computer;
accessing the determined data from the shared file server; and
sending the determined data to the requesting client computer; and
wherein each second cluster node cache entry comprises a key that is generated by: extracting relevant information as one or more character strings from one or more of: the incoming discovery request and one or more negotiation messages intercepted by the second cluster node, and processing the extracted information using a cryptographic hash function to generate a unique key for the particular one or more character strings.

9. The computer implemented method of claim 8, wherein the cache invalidation notification is generated by creating an entry in a distributed hash table to which the first and second cluster nodes subscribe.

10. The computer implemented method of claim 9, wherein the entry in the distributed hash table comprises:
   a notification name indicating the one or more cache entries that are to be invalidated; and
   a marker comprising a unique identifier of the first cluster node.

11. The computer implemented method of claim 10, wherein the notification name comprises:
   a repository identifier uniquely identifying a particular source code repository; and
   the key identifying one or more cache entries in respect of the particular source code repository that are to be invalidated.

12. The computer implemented method of claim 10, wherein the notification name comprises an indication that all cache entries in respect of all source code repositories are to be invalidated.

13. The computer implemented method of claim 10, wherein the marker further comprises a unique invalidation event version number.

14. The computer implemented method of claim 8, wherein the incoming request is in respect of a push operation.

15. A computer processing system operating as a first cluster node in a clustered source code management system, the computer processing system comprising:
   one or more processors;
   a communications interface; and
   one or more non-transitory computer-readable storage media storing sequences of instructions which, when executed by the one or more processors, cause the one or more processors to:
   receive, via the communications interface, an incoming request from a client computer, the incoming request being a source code management protocol request;
   determine that the incoming request is in respect of a source code management protocol operation that involves a change being made to repository data stored on a shared file server of the clustered source code management system; and
   responsive to determining that the further incoming request is in respect of a source code management protocol operation that involves a change being made to the repository data stored on the shared file server, generate a cache invalidation notification, wherein:
   the cache invalidation notification causes at least a second cluster node of the clustered source code management system to invalidate one or more second cluster node cache entries;
   each second cluster node cache entry is a cache entry stored by the second cluster node on storage media locally accessible to the second cluster node; and
   each second cluster node cache entry comprises a response to a separate incoming discovery request, each separate incoming discovery request being a source code management protocol request received by the second cluster node from a client computer and being a request to discover repository data stored on the shared file server,
   wherein, in response to intercepting one or more negotiation messages between the requesting client computer and the clustered source code management shared file server,
   determining response data to send to the requesting client computer;
   accessing the determined data from the shared file server; and
   sending the determined data to the requesting client computer; and
   wherein each second cluster node cache entry comprises a key that is generated by: extracting relevant information as one or more character strings from one or more of: the incoming discovery request and one or more negotiation messages intercepted by the second cluster node, and processing the extracted information using a cryptographic hash function to generate a unique key for the particular one or more character strings.

16. The computer processing system of claim 15, wherein the cache invalidation notification is generated by creating an entry in a distributed hash table to which the first and second cluster nodes subscribe.

17. The computer processing system of claim 16, wherein the entry in the distributed hash table comprises:
   a notification name indicating the one or more cache entries that are to be invalidated; and
   a marker comprising a unique identifier of the first cluster node.

18. The computer processing system of claim 17, wherein the notification name comprises:
   a repository identifier uniquely identifying a particular source code repository; and
   the key identifying one or more cache entries in respect of the particular source code repository that are to be invalidated.

19. The computer processing system of claim 17, wherein the notification name comprises an indication that all cache entries in respect of all source code repositories are to be invalidated.

20. The computer processing system of claim 17, wherein the marker further comprises a unique invalidation event version number.

21. The computer processing system of claim 15, wherein the incoming request is in respect of a push operation.

* * * * *